3,236,817
ANIONIC PROCESS FOR PREPARING HIGH MOLECULAR WEIGHT POLYAMIDES FROM LACTAMS
Joseph Zimmerman, Green Acres, Del., assignor to E. I. du Pont de Nemours and Company, Wilmington, Del., a corporation of Delaware
No Drawing. Filed Oct. 17, 1961, Ser. No. 145,763
7 Claims. (Cl. 260—78)

This invention relates to the preparation of high molecular weight polymers from cyclic amides and more particularly to the preparation of high molecular weight polymers in the form of shaped articles from epsilon-caprolactam. This is a continuation-in-part of my co-pending application, Serial Number 491,220, filed February 28, 1955, now abandoned.

Heretofore, it has been known that cyclic amides can be polymerized by heating the monomer in a molten condition, preferably at temperatures of about 215° C. to 225° C. in the presence of such initiators as alkaline metals, hydrides, and hydroxides, the polymerization reaction forming a high molecular weight polymer in equilibrium with a certain amount of low molecular weight water-extractable material (cyclic monomer, dimer, and trimer) cf. Joyce et al., U.S. Patent 2,251,519, issued August 5, 1941, and Mighton, U.S. Patent 2,647,105, issued July 28, 1953).

In general, it was recognized in the prior art that at the optimum reaction times for each temperature tested, the lower the temperature attained within the range hereinabove specified, the higher the inherent viscosity of the polymer which is formed and the lower the quantity of water-extractable material at equilibrium.

The situation was complicated, however, because the polymerization of cyclic amides in the presence of the polymerization initiators of the kind described by Mighton (i.e., initiators which are capable of substituting a metal for H attached to N in caprolactam), gave a polymer of very high molecular weight in the initial stages of the polymerization which was converted to lower molecular weight polymer at subsequent heating. As a result, in processes where it is necessary to pass molten polymer through a conduit, the peak molecular weight must be limited to make it possible to transfer the polymer. This can be accomplished by using a sufficiently large concentration of initiator or a sufficiently high temperature. For injection molding, the maximum molecular weight which can be handled commercially corresponds to a relative viscosity (of an 8.5% solution of polymer in 90% formic acid measured in an Ostwald viscometer at 25° C.) of 150. However, it is known that the physical properties of shaped polyamide-molded articles improve as molecular weight is increased. Therefore, it would be desirable to make use of the very high molecular weights uniquely made available by the types of initiators mentioned above without the restrictions imposed by the necessity of having to transfer the highly viscous polymer, e.g. through a conduit. Formation of this very high molecular weight product is preceded by an induction period which increases in length with decreasing temperature. This, in itself, constitutes a factor which further complicates the problem of preparing shaped articles economically from cyclic amides of such high molecular weight.

An object of this invention is to provide a process for making shaped articles composed of cyclic amides of molecular weight so high that the polymer cannot be handled by ordinary shaping under conditions requiring flowability of the resin. Other objects will become apparent as the description proceeds.

It has been discovered in accordance with this invention that shaped articles of very high molecular weight polyamides can be made by adding a small quantity of initiator of the type mentioned above to a cyclic amide containing a molar concentration of water less than the concentration of initiator, heating at relatively low temperatures (e.g., 100° C.), to replace the amide hydrogen by an alkali or alkali earth metal, holding the mixture at the desired polymerization temperature for a limited time and just before the onset of the rapid polymerization, transferring it into a shaping means and allowing the polymerization to proceed until the relative viscosity reaches its peak and then quenching.

The resulting shaped mass may be quenched at this time or any time thereafter, depending on the molecular weight desired (in general a relative viscosity greater than 150), and desirability of approaching equilibrium water-extractable content very closely. When the invention is practiced at the temperatures recommended (see below), the rate of decrease of molecular weight from the peak value is sufficiently slow that satisfactory control of the molecular weight of the product can be obtained.

Since the presence of low molecular weight material in the polymer tends to have a deleterious effect on the physical properties and causes difficulties in handling as well as having possible toxic effects, it is desirable to minimize the concentration of or extract such low molecular weight material. Since it is known in the prior art that the equilibrium extractables concentration decreases at decreasing temperature, operation at the low range of operable temperatures will yield better polymer in this respect as well as higher molecular weight polymer, as has been previously mentioned.

For an understanding of the present invention, the following should be recognized. The molecular weight of the polymer can be increased markedly with decreasing catalyst concentration, the limit being imposed by the moisture content and impurity level of the cyclic amide. With high quality caprolactam, which can be produced by commercial methods, it is possible to use as little as 0.2 mole percent of lithium hydride catalyst and obtain a molecular weight of approximately 100,000 at a suitable temperature. Superimposed on the effect of catalyst concentration is the effect of temperature, and the highest molecular weights can be obtained by operating in the lower temperature range from 300° C. down to the melting point of the polymer (e.g. 215° C. for polycaproamide) and even as low as 185° C. Operation below the melting point has the additional advantage that the equilibrium water-extractables content is quite low (3% or less).

The catalysts or initiators which are effective in the practice of this invention include alkali metals, alkali metal hydrides, alkaline earth metals, alkaline earth metal hydrides, and other substances capable of substituting the amide hydrogen of a lactam by metal. Typical examples are lithium hydride, lithium aluminum hydride, sodium metal, sodium amide, calcium hydride, etc.

In carrying out the reaction, it is frequently helpful to employ a temperature somewhat lower than the polymerization temperature (e.g., about 100° C.) until the substitution reaction has taken place and thereafter to heat the mixture above 185° C., but not more than 300° C. Since the duration of the induction period depends not only on temperature, but also to a certain extent upon the content of impurities, especially moisture, in the monomer, the time required for induction at the prevailing temperature is most satisfactorily estimated by heating a pilot quantity of the particular monomer-catalyst composition and noting the time which expires before the onset of the very rapid polymerization period. The temperature used during induction can be any suitable temperature which is sufficiently high to effect the polymerization, 185° C. to 300° C., as explained in further detail hereinafter.

Once the polymerization starts, it goes rapidly, forming a high molecular weight polymer within a few seconds to a few minutes. The peak may be reached at approximately the same time as either the equilibrium monomer concentration is reached or the concentration of active catalyst is reduced to negligible proportions by the action of impurities or other chain terminating reactions. Subsequently, the molecular weight and viscosity drop and gradually level off. At higher temperatures, 265° C., this descent from peak molecular weight is rapid, almost complete in 30 minutes, but at lower temperatures is sufficiently slow that the control of molecular weight of the shaped article is relatively easy. In practice, it may be, as mentioned above, that at the time the peak viscosity is reached, the equilibrium extractables content is not yet attained. In this case, it may be desirable to continue the polymerization to bring the extractables content closer to its equilibrium value, the procedure used depending on whether it is the molecular weight or extractables content which is more important for any particular application.

The concentration of catalyst is not critical, although it is generally more desirable to use as small a concentration as possible consistent with a given cycloamide quality in order to obtain a high molecular weight.

In order that the invention may be better understood, the following explanation of the chemistry involved is set forth:

The first reaction which occurs between the base added as catalyst and the omega-lactam monomer can be illustrated, for instance, by the reaction of sodium metal with caprolactam:

(1)

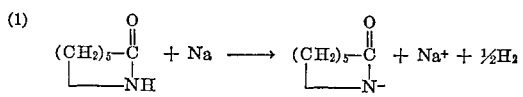

The iminium ion formed is the anionic catalyst for the subsequent polymerization. As pointed out above, any alkali metal, alkaline earth metal, or any strongly basic compound of such metals, including, but not limited to, the metal hydrides and metal amides, can be employed. If the alkoxides or hydroxides are employed, a somewhat longer subsequent induction period is required to drive off all alcohol or water formed by the reaction of the base with the caprolactam.

The second step of the polymerization, which occurs at polymerization temperatures during the induction period after all traces of water have been distilled off, is a relatively slow reaction between the anionic catalyst and another monomer molecule:

(2)

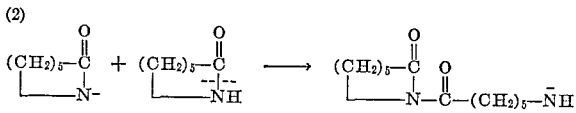

where the dotted line indicates the bond broken by the reaction. The above reaction occurs to an appreciable extent only in an anhydrous medium, and the rate is rather slow, particularly at temperatures below about 185° C. The dimer anion then reacts with more caprolactam to regenerate the the anionic catalyst and produce an uncharged dimer molecule:

(3)

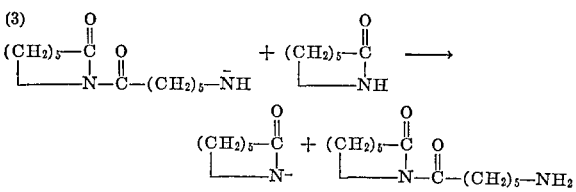

This dimer molecule, once formed in appreciable concentration, acts as a promoter of very rapid polymerization of caprolactam in the presence of the iminium anion.

This polymerization step is very rapid even at temperatures well below the melting point of the resulting polyamide, for example at temperatures in the range of 185°–200° C., or even below. This activation from the dimer is believed due to the much greater ease with which, and hence much faster rate at which, the iminium anion can split the bond between a tertiary nitrogen atom which is activated by two attached acyl groups, as shown by the following equation:

(4)

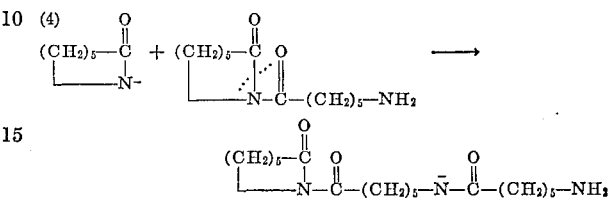

where again, the dotted line indicates the point of attack. This trimeric anion again reacts with caprolactam monomer to regenate the anionic catalyst and this very rapid polymerization continues to produce a very high molecular weight polyamide.

As pointed out above, the highest molecular weight polyamide is obtained at the lower polymerization temperatures. It is therefore preferred to carry out the polymerization at a temperature below 215° C., the melting point of polycaprolactam. Very rapid polymerization can be achieved at 185° to 200° C., after the induction period, with pure, anhydrous caprolactam.

Thus, by the process of this invention, it is possible to catalyze caprolactam with one of the bases described hereinabove and then hold it at polymerization temperature, 185° to 300° C., but in the preferred case at a temperature below the melting point of polycaprolactam (e.g. at 197° C.), during the induction period while the dimeric promoter is formed, and then transfer the catalyzed caprolactam while still substantially monomeric and hence readily flowable, into a mold, and thereupon obtain rapid polymerization in the mold, below the melting point of the resultant polyamide, to produce a shaped article of polycaprolactam having an exceptionally high molecular weight and stiffness, due in part to a low residual, extractable monomer content. It is desirable to quench the reaction by cooling immediately following the polymerization in order to maintain the original high molecular weight, since it is well known that strong bases at temperatures of the order of 215° C. and above catalyze polyamide splitting and hence molecular weight redistribution in the direction of lower molecular weight.

The following examples serve to illustrate the invention but they are not intended to limit it thereto:

*Example I*

Polycaproamide of very high molecular weight was obtained as follows: Epsilon-caprolactam (recrystallized from cyclohexane) was heated with 0.2 mol percent lithium hydride for about 15 minutes at 100° C. while hydrogen was evolved. The mixture was thereafter heated at 232° C. for 30 minutes. After an induction period of approximately 15 minutes the polymerization began, and within a few minutes the melt became extremely viscous. A relative viscosity (of an 8.5% solution of polymer in 90% formic acid) of 1885 was reached after a total time of 30 minutes at 232° C. This corresponds to a molecular weight of approximately 100,000. At this point the water extractables concentration was 14.5% (equilibrium 7%). After 30 minutes of additional heating the relative viscosity dropped only to 1585 and the water extractables concentration decreased to 10%.

*Example II*

The course of polymerization below the melting point of the polymer is illustrated by the following example: Epsilon-caprolactam containing 0.8 mol percent lithium hydride was brought to a temperature of 197° C. after an initial period at 100° C., during which the lithium salt of caprolactam was formed. The polymerization started after an induction period of approximately 30 minutes. After 55 minutes, the material became extremely viscous and after 140 minutes of total heating time, the relative viscosity of the polymer was 709 with a water extractables concentration of 6.9%. The full potentiality of low temperatures in combination with low catalyst concentration for obtaining very high molecular weight polymer can be best realized with very pure and very dry epsilon-caprolactam.

The results obtained in the above example were unexpected because polymerization below the melting point has been reported in the past as resulting in a high molecular weight solid polymer with low monomer content which cannot be injection molded.

In addition, lower temperature operation leads to less degradation of the polymer as the mechanism of decarboxylation of the polymer, which is known to occur, is reduced.

*Example III*

With commercial caprolactam of high quality, a good method of practicing the invention to obtain the highest molecular weight is as follows: Epsilon-caprolactam containing about 0.2 mole percent of sodium hydride is heated at 100° C. until the evolution of hydrogen ceases. The mixture is then brought to a temperature of about 220° C. and held at that temperature until just before the end of the induction period (the actual time predetermined by heating a pilot quantity of the mixture). The resulting material is immediately transferred to a shaping means and the heating continued at the same temperature. Since the reaction is exothermic, and is so rapid, the temperature of the polymer may be used as an indication of the onset of the polymerization. The contents of the shaping means may be quenched by cooling with a liquid within a few minutes after the onset of polymerization. This will generally correspond to the highest obtainable molecular weight. In some cases, the water extractables concentration may continue to be as much as 10 percent or more because of exhaustion of the active catalyst, and in these cases it may be desirable to continue heating before quenching. However, it is possible to remove residual extractables from the shaped article by washing with a hot liquid, preferably water. Even by operating at temperatures as high as 265° C. with catalyst concentrations of about 0.4 mole percent, it is possible to obtain molecular weights higher than can be handled by commercial methods of injection molding (e.g., relative viscosity of 150) and equilibrium extractables content of 10% is reached within several minutes after the onset of polymerization. Under these conditions, the shaping means must be quenched rapidly to prevent appreciable viscosity decrease.

The invention is especially valuable in the production of very high molecular weight (relative viscosity greater than 150) high quality polyamide molded articles with improved properties such as tensile strength, impact strength, fatigue endurance limit, etc. from polymer which is very difficult to process by present commercial methods of injection molding.

As previously indicated, it is preferred to operate at the lowest feasible temperature for the actual polymerization step. The greatest improvement in physical properties of the molded polyamide articles is achieved, therefore, when the catalyzed monomer, at the end of the induction period, is transferred to the mold and polymerized therein at a temperature below the melting point of the resultant polyamide.

Obviously, if desired, induction periods can be shortened by carrying out the induction reaction at a higher temperature, even above the melting point of the resulting polyamide, and then cooling the catalyzed monomer to a polymerization temperature below the melting point of the resultant polymer before the rapid polymerization ensues.

Inherently, the use of low viscosity, molten monomer for the casting step avoids the use of heavy, expensive molding machines and molds and makes possible fabrication of superior polyamide articles using thin-walled molds and low pressure equipment. The lower heat capacity of the molds makes possible faster cycles and more economical production, particularly of larger shapes, than is possible by molding of prepolymerized polyamides. Due to the shrinkage which occurs when the monomeric molten lactam is converted to a solid polyamide, the shaped articles can readily be removed from the mold and allowed to cool as soon as the polymerizing mixture has solidified.

The process of this invention is, in general, applicable to monomeric cyclic amides containing more than 6 annular atoms, such as cyclohexanone isoxime (epsilon-caprolactam), the methyl cyclohexanone isoximes, cycloheptanone isoxime, cyclooctanone isoxime, cyclopentadecanone isoxime, and cyclohexadecanone isodixime. All of these materials generically are classified as omega-lactams. It is particularly applicable, however, to epsilon-caprolactam. These isoximes may be obtained by the rearrangement of the corresponding cyclic ketoximes with sulfuric acid.

The foregoing detailed description has been given for clearness of understanding only and no unnecessary limitations are to be understood therefrom. The invention is not limited to the exact details shown and described for obvious modifications will occur to those skilled in the art.

I claim:
1. A process for fabricating shaped articles consisting essentially of a polymer of omega-lactam which comprises the following steps:
   (a) heating a dry monomeric omega-lactam with a catalytic amount of a strong base selected from the group consisting of strongly basic compounds of the alkali metals and alkaline earth metals thereby forming the corresponding metal lactam salt catalyst;
   (b) raising the temperature of the resulting catalyzed mixture of lactam and metal lactam salt to temperatures that are sufficiently high to effect polymerization but below the melting point of polycaprolactam for an induction period in order to form a promoter compound having the formula

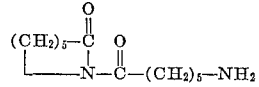

(c) just prior to the onset of rapid polymerization transferring to a mold the catalyzed and promoter containing fluid omega-lactam mixture maintained at polymerization temperatures below the melting point of the resultant polylactam;
   (d) allowing the ensuing rapid polymerization to occur in the mold to produce a solid polylactam article by polymerizing below the melting point of the polylactam; and
   (e) immediately after the rapid polymerization removing the solid shaped article from the mold and allowing it to cool.

2. A process for fabricating shaped articles consisting essentially of polycaprolactam which comprises the following steps:
   (a) heating ε-caprolactam at a temperature of about 100° C. with from 0.2 to 0.8 mole percent of an alkali metal hydride until evolution of hydrogen ceases and the alkali metal lactam catalyst is produced;
   (b) raising the temperature of the resulting catalyzed mixture of lactam and alkali metal lactam to polymerization temperatures of the order of about 185° C.

but below the melting point of polycaprolactam for an induction period in order to form a promoter compound having the formula

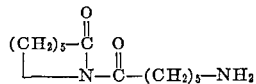

(c) just prior to the onset of rapid polymerization transferring to a mold the catalyzed and promoter containing fluid ε-caprolactam mixture maintained at a polymerization temperature below the melting point of polycaprolactam;

(d) allowing the ensuing rapid polymerization to occur in the mold to produce a solid polyamide article by polymerization below the melting point of the polycaprolactam; and (e) immediately after the rapid polymerization removing the shaped article from the mold and allowing it to cool.

3. A process according to claim 1 in which the omega-lactam is caprolactam.

4. A process according to claim 1 in which the strong base is an alkali metal hydride.

5. A process according to claim 4 in which the alkali metal hydride is sodium hydride.

6. A process according to claim 4 in which the alkali metal hydride is lithium hydride.

7. A process according to claim 1 in which the polymerization temperature employed in steps (a) and (b) is in the range of 185° to 200° C.

References Cited by the Examiner

UNITED STATES PATENTS

| | | | |
|---|---|---|---|
| 2,251,519 | 8/1941 | Joyce et al. | 260—78 |
| 2,647,105 | 7/1953 | Mighton | 260—78 |
| 2,668,328 | 2/1954 | Porter | 18—58 |
| 2,749,960 | 6/1956 | Schwartz | 260—77.5 |
| 2,764,565 | 9/1956 | Hoppe et al. | 260—77.5 |
| 2,884,414 | 4/1959 | Indest et al. | 260—78 |

FOREIGN PATENTS

| | | |
|---|---|---|
| 906,889 | 2/1946 | France. |
| 518,697 | 4/1953 | Belgium. |

OTHER REFERENCES

Hanford et al.: Journal of Polymer Science, pp. 167–172, vol. 3, April 1948.

Ser. No. 309,376, Friederich et al. (A.P.C.), published Apr. 20, 1943.

WILLIAM H. SHORT, *Primary Examiner.*

H. N. BURNSTEIN, *Examiner.*